United States Patent
Goodwill (10) Patent No.: US 9,360,622 B2
(45) Date of Patent: Jun. 7, 2016

(54) LOW LOSS OPTICAL CROSSING AND METHOD OF MAKING SAME

(71) Applicant: Huawei Technologies Co., Ltd., Shenzhen (CN)

(72) Inventor: Dominic John Goodwill, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 135 days.

(21) Appl. No.: 14/165,229

(22) Filed: Jan. 27, 2014

(65) Prior Publication Data
US 2015/0212268 A1     Jul. 30, 2015

(51) Int. Cl.
| | |
|---|---|
| *G02B 6/12* | (2006.01) |
| *G02B 6/125* | (2006.01) |
| *G02B 6/35* | (2006.01) |
| G02B 6/122 | (2006.01) |
| G02B 6/293 | (2006.01) |
| G02B 6/26 | (2006.01) |

(52) U.S. Cl.
CPC .............. *G02B 6/125* (2013.01); *G02B 6/3596* (2013.01); *G02B 6/12* (2013.01); *G02B 6/122* (2013.01); *G02B 6/26* (2013.01); *G02B 6/2935* (2013.01); *G02B 2006/12085* (2013.01); *G02B 2006/12097* (2013.01); *G02B 2006/12195* (2013.01)

(58) Field of Classification Search
CPC ........... G02B 2006/12085; G02B 2006/12097; G02B 6/12; G02B 6/122; G02B 6/26; G02B 6/2935
See application file for complete search history.

(56) References Cited

U.S. PATENT DOCUMENTS

| 6,356,679 | B1 | 3/2002 | Kapany |
| 7,058,259 | B2 | 6/2006 | Stuart |
| 8,948,555 | B1 * | 2/2015 | Roth et al. ...................... 385/45 |
| 2002/0159739 | A1 * | 10/2002 | Yang et al. .................... 385/129 |
| 2003/0035613 | A1 * | 2/2003 | Huber et al. .................... 385/16 |
| 2004/0190830 | A1 | 9/2004 | Rasras |
| 2008/0253713 | A1 | 10/2008 | Piede et al. |
| 2009/0092355 | A1 * | 4/2009 | Feuer et al. ..................... 385/14 |

OTHER PUBLICATIONS

Chen, L., et al., "Compact, low-loss and low-power 8×8 broadband silicon optical switch," Optics Express, vol. 20, No. 17, Aug. 13, 2012, pp. 18977-18985.
Li, G., et al., Ultralow-loss, high-density SOI optical waveguide routing for macrochip interconnects, Optics Express, vol. 20, No. 11, May 21, 2012, pp. 12035-12039.
International Search Report and Written Opinion received in Application No. PCT/US15/12732 mailed Aug. 28, 2015, 8 pages.

* cited by examiner

*Primary Examiner* — Ryan Lepisto
*Assistant Examiner* — Mary A El Shammaa
(74) *Attorney, Agent, or Firm* — Slater Matsil, LLP (57) ABSTRACT

A low loss optical crossing and a method of making an optical crossing in a photonic integrated circuit. An optical crossing embodiment includes a crossing region having a crossing length, wherein a light path through the crossing region is laterally unbound; an input waveguide having an input crossing end and an input distal end, and coupled to the crossing region at the input crossing end, thereby partially forming the light path; and an output waveguide having an output crossing end and an output distal end, and coupled to the crossing region at the output crossing end, thereby partially forming the light path, wherein a crossing width of the output waveguide at the output crossing end is larger than a crossing width of the input waveguide at the input crossing end according to the crossing length, and wherein a lateral center of the output waveguide at the output crossing end is laterally displaced by an offset from a lateral center of the input waveguide at the input crossing end according to the crossing length.

23 Claims, 5 Drawing Sheets

LOW LOSS OPTICAL CROSSING AND METHOD OF MAKING SAME

TECHNICAL FIELD

This invention relates generally to photonic integrated circuits (PICs) and, more specifically, to an optical crossing and method of making the same.

BACKGROUND

A PIC is a device that integrates multiple photonic circuit elements, analogous to electronic integrated circuits. PICs are distinct from electronic integrated circuits in that they use light rather than electrons to carry out a variety of optical functions. PICs allow optical systems to be made more compact, more efficient, more capable, and less expensive than with discrete optical components. PICs are often found in optical communication systems and photonic computing systems, where demand for high-speed and high-bandwidth circuits is ever increasing. The need for denser, more complex PICs grows with the demand for speed and bandwidth. Low-loss photonic circuit elements, such as self-imaging crossings and diffractive beam propagation crossings, allow these demands to be met in a wide variety of devices, including photonic switches, adaptive filters, multi-carrier transceivers, modulators, multiplexers, and demultiplexers, among many others.

PICs generally include multiple optical waveguides and are fabricated from a variety of materials, including silicon, silica, lithium niobate (LiNbO3), gallium arsenide (GaAs), indium phosphide (InP), lead lanthanum zirconate titanate (PLZT), and silicon nitride (Si3N4). For example, in silicon optical waveguides, a typical structure includes a silicon core having a high refractive index surrounded by silicon dioxide (silica) cladding having a low refractive index, which is typically fabricated on a silicon wafer. This structure is common for communication wavelengths, such as the 1310 nm band, the 1490 nm band, and the 1550 nm band. A PIC can be formed by lithographic techniques, including optical lithography and electron-beam lithography. Optical proximity correction techniques can be used to enhance the optical lithography to improve the fabrication precision of photonic circuit elements by more accurately creating the desired element shapes in the PIC material.

SUMMARY OF THE INVENTION

Embodiments of the present invention provide an optical crossing and a method for making an optical crossing.

A PIC embodiment having an optical crossing includes a crossing region having a crossing length, wherein a light path through the crossing region is laterally unbound. The PIC embodiment also includes an input waveguide and an output waveguide. The input waveguide has an input crossing end and an input distal end, and is coupled to the crossing region at the input crossing end, thereby partially forming the light path. The output waveguide has an output crossing end and an output distal end, and is also coupled to the crossing region at the output crossing end, partially forming the light path. A crossing width of the output waveguide at the output crossing end is larger than a crossing width of the input waveguide at the input crossing end, the difference being set according to the crossing length. Additionally, a lateral center of the output waveguide at the output crossing end is laterally displaced by an offset from a lateral center of the input waveguide at the input crossing end, which is also set according to the crossing length.

A method embodiment for making an optical crossing in a PIC includes forming a waveguide. Then a crossing waveguide is formed that bisects the waveguide into an input waveguide and an output waveguide, thereby forming a crossing region. At the crossing region, the output waveguide is wider than the input waveguide, and the output waveguide is displaced laterally by an offset according to diffraction of a light beam traveling through the crossing region.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

For a more complete understanding of the present disclosure and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of embodiments of the present invention and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

A typical PIC waveguide includes a dielectric region of high refractive index surrounded vertically and laterally by at least one dielectric region of lower refractive index, forming a rectangular or square optical waveguide. Such a waveguide supports zero or more optical modes that are bound, where a bound optical mode propagates along the waveguide without radiating away from the waveguide. The bound optical mode with the highest propagation constant is known as the lowest-order mode. The lowest-order mode has a peak amplitude toward the center of the waveguide core, decaying monotonically away from the peak. Generally, there is a lowest-order mode of a transverse electrical (TE) polarization and a lowest-order mode of a transverse magnetic (TM) polarization, where the strongest electromagnetic field component is respectively an electrical field (TE) or magnetic field (TM) that is parallel to the plane of the substrate.

Complex PICs often include at least one optical waveguide that physically crosses one or more other optical waveguides, forming a crossing region at the intersection. In some PICs, a single lightpath can have 100 or more optical crossings in series. The crossings can be at any angle, for example, a crossing at 90 degrees, a crossing at 45 degrees, a crossing at 30 degrees, or any other angle. Optical crossings can introduce loss and crosstalk to the optical signals propagating through. As a light beam propagates through the crossing region, signal power is lost into the crossing waveguide, causing crosstalk into the crossing waveguide. Similarly, the light beam also experiences crosstalk from the signal propagating through the crossing waveguide. Light is also lost from the light beam by scattering and radiation in the vertical and lateral directions out of the wave guiding regions.

As a light beam leaves the narrow aperture of an input waveguide, entering the crossing region, the light beam diffracts and gets larger as it propagates through the crossing region. When the light beam reaches the output waveguide, it presents in a larger output mode. Many PIC technologies support a single optical layer, with all crossings in-plane. Consequently, the lightpath through the crossing region is typically bound vertically and unbound laterally, where vertical describes a plane that is normal to the PIC chip surface and lateral refers to the plane of the chip and perpendicular to the direction of propagation of the light beam. Furthermore, expansion of the light beam propagating through the crossing region is typically lateral. Additional layers are possible, in which case the crossing region would be further unbound vertically and vertical beam expansion would be expected.

Some PICs use very wide multi-mode waveguides that experience low loss when only the lowest order optical mode is excited. The high refractive index contrast of a silicon waveguide enhances scattering loss at the core-cladding boundary. These waveguides use a very large core with a shallow ridge, or shoulder. These waveguides are sometimes referred to as wide-ridge waveguides, or simply ridge waveguides. By exciting only the lowest order optical mode, most of the electromagnetic (EM) field is confined within the silicon core such that the amplitude of the electromagnetic field is small at the core-cladding boundary to reduce scattering effects, and scattering is further reduced by the small height of the core-cladding boundary of the shallow silicon ridge relative to the overall size of the core. One way for these multi-mode waveguides to cross each other is by diffractive beam crossings. As the light of the lowest order optical mode reaches the crossing region, the optical mode becomes a light beam that propagates through the crossing region and, again, the electromagnetic field of the light beam is well confined to the core and scattering is reduced by the shallow ridge, resulting in a low-loss crossing.

It is realized herein the already low-loss crossing with very wide multi-mode waveguides can be improved by further accounting for beam expansion as a light beam propagates through a crossing region from an input waveguide to an output waveguide. It is realized herein the output waveguide should have a larger mode size than the input waveguide, thereby maximizing the overlap of the light beam and optical mode of the output waveguide. The increase in mode size can be computed according to an expected beam expansion through the crossing region. For example, beam expansion can be computed using a paraxial Gaussian beam calculation, which depends on the propagation distance across the crossing region, among other parameters, including the refractive index of the materials in the crossing, the electromagnetic cross-section of the input optical mode, and the electromagnetic cross-section of the output optical mode. For example, for an input waveguide having a width of 6.00 micrometers of silicon intersecting a crossing waveguide of the same width, the corresponding output waveguide could be 6.13 micrometers based on a calculated beam expansion for a given free-space wavelength of 1550 nm.

It is also realized herein the already low-loss crossing can be further improved by accounting for the angular alignment of the light beam propagating through the crossing region. It is realized herein that when the output crossing waveguide is larger than the input crossing waveguide, the crossing end of the input waveguide is no longer perpendicular to the input waveguide. Consequently, the optical beam refracts at the crossing end of the input waveguide and propagates at a small angle laterally. The diffracted optical beam in the crossing is also refracted as it enters the crossing. It is further realized herein, the output waveguide should be displaced laterally by an offset from the input waveguide, according to an expected refraction of the light beam as it enters the crossing region, among other parameters, including the refractive index of the materials in the crossing, the electromagnetic cross-section of the input optical mode, and the electromagnetic cross-section of the output optical mode. Rather than the input and output waveguides being co-linear, it is realized herein, the displaced output waveguide is centered on the diffracted light beam at the crossing end of the output waveguide, thereby further maximizing the overlap of the diffracted light beam with the optical mode of the output waveguide.

It is further realized herein the optimum difference in width between the input and output waveguides is related to the lateral offset between the input and output waveguides. A PIC designer should calculate them together with a goal of optimization. For example, larger lateral offsets generally accompany larger differences in widths between the input and output waveguides.

It is also realized herein that crossings often occur in series, creating a practical problem for output waveguides that are progressively larger as the lightpath spans each crossing. It is also realized herein the output waveguide of a crossing can be tapered down to the width of the input waveguide between crossings. In this arrangement, in a PIC having a series of crossings, the width of the input waveguide is the same entering each crossing, and the output waveguide is larger at the crossing and tapers back down to the width of the input waveguide as the light beam propagates.

Figure 1:
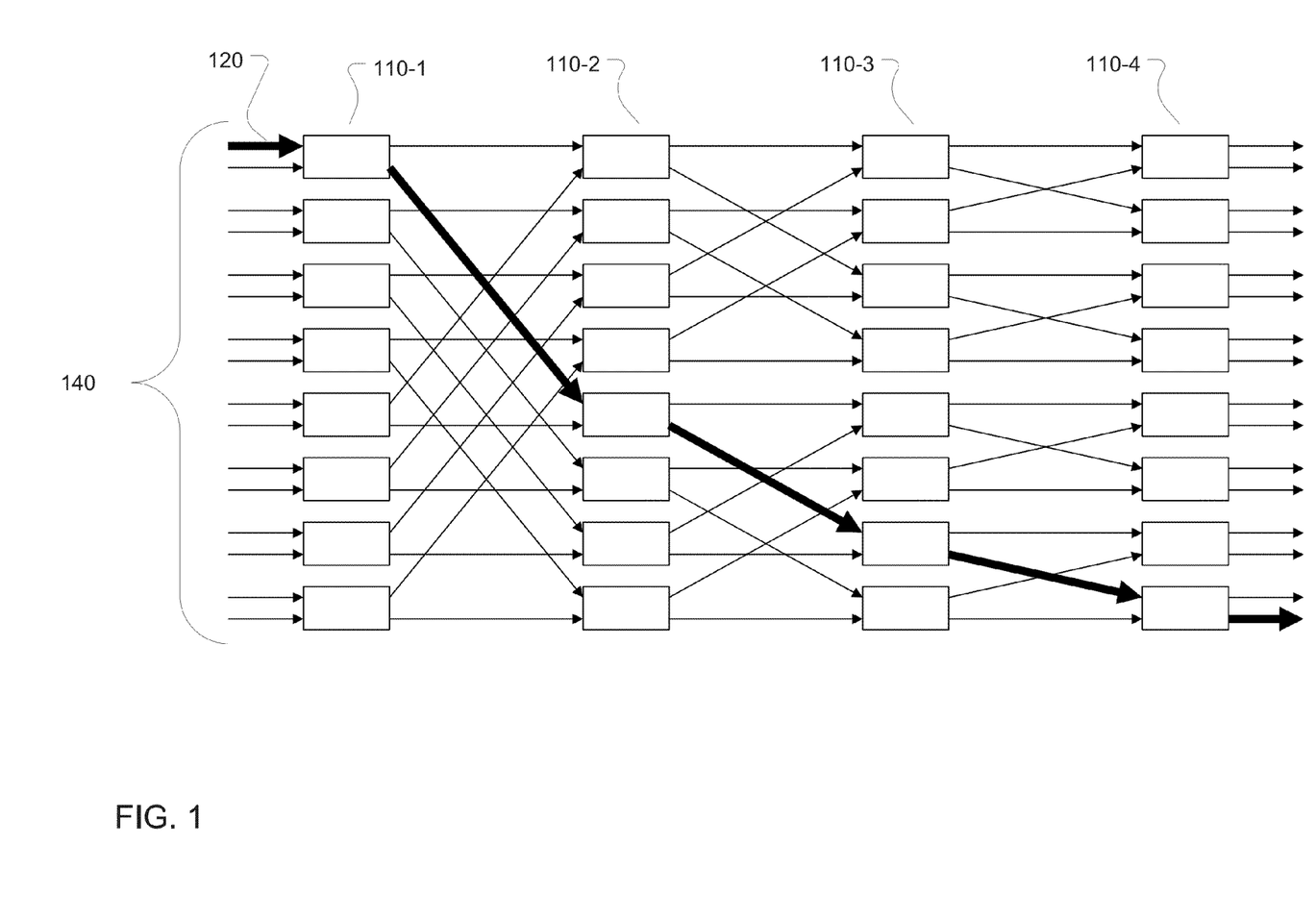
FIG. 1 is a schematic diagram of one embodiment of a PIC.

FIG. 1 is a schematic diagram of one embodiment of a PIC 100 within which the optical crossing and method of making an optical crossing introduced herein may be embodied or carried out. PIC 100 includes four columns of switch elements, column 110-1, column 110-2, column 110-3, and column 110-4, arranged to form a portion of a photonic switch. As light paths 140 enter the switch elements of column 110-1, PIC 100 routes them to various switch elements in column 110-2, causing most light paths to incur multiple crossings. For example, a light path 120 (emphasized in bold) passes through seven crossings between column 110-1 and column 110-2, three crossings between column 110-2 and column 110-3, and one crossing between column 110-3 and column 110-4, totaling eleven crossings. Other embodiments of PIC 100 can include hundreds of crossings for a single light path before it exits as switched light beams 150.

Figure 2:
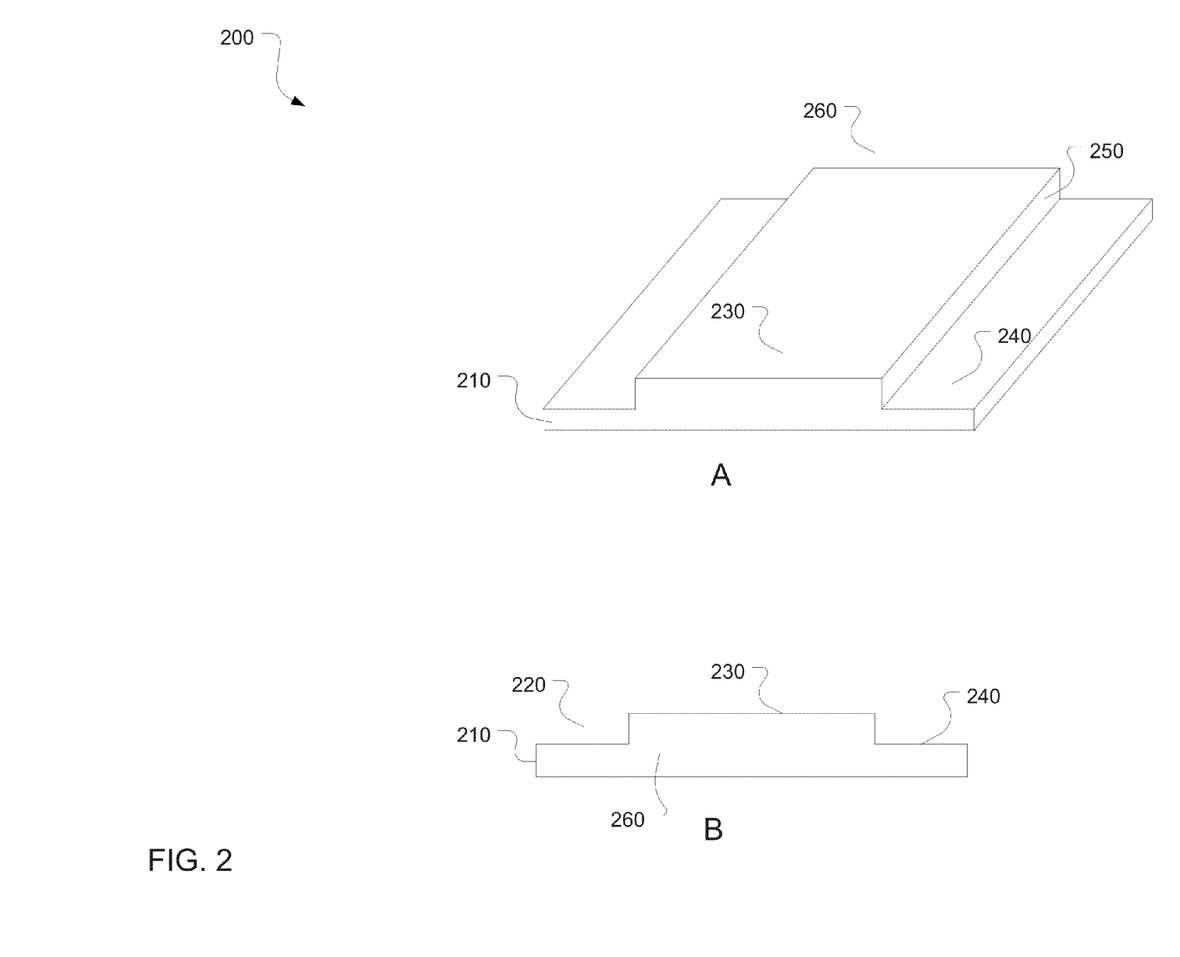
FIG. 2 is an illustration of a cross section of one embodiment of a very wide multi-mode optical ridge waveguide.

FIG. 2 is an illustration of one embodiment of a very wide multi-mode optical ridge waveguide 200. Section A illustrates a propagation dimension of waveguide 200, and Section B illustrates a cross section of waveguide 200. Waveguide 200 is wide enough to support multiple optical modes, only the lowest order mode, or the fundamental mode, of waveguide 200 is excited. Typically, this is achieved by forming the light path with a narrow single-mode waveguide (not shown in FIG. 2) that supports only a lowest-order mode. The narrow single-mode waveguide gradually tapers to the wide multi-mode waveguide 200. So long as the taper is gentle, the light remains in the lowest-order mode. An optical signal passing through waveguide 200 in the lowest order mode experiences very low loss.

Waveguide 200 includes a core 260 having a ridge 230 surrounded laterally by a shoulder 210 and another shoulder 240. Core 260 is surrounded by a cladding 220. In certain embodiments, cladding 220 is homogeneous, while in alternative embodiments, cladding 220 can vary among the sides of core 260. Waveguide 200 can be formed using a variety of material systems. For example, in one embodiment using silicon and silica, core 260 is made of silicon. The silicon of ridge 230 has a larger depth than shoulder 210 and shoulder 240, forming a sidewall 250 at the boundary of ridge 230 and shoulder 240, and another sidewall at the boundary of ridge 230 and shoulder 210 that is not visible in FIG. 2. The sidewalls are formed by etching, leaving the sidewalls rough, which contributes to scattering loss. The top and bottom surfaces of ridge 230, shoulder 210, and shoulder 240 are typically much smoother and contribute little loss. Shoulder 240 and shoulder 210 push a portion of core 260's sidewalls out wider, such that the fundamental mode in waveguide 200 is confined in the center, further from the sidewalls, thus reducing scattering loss for the fundamental mode.

Figure 3:
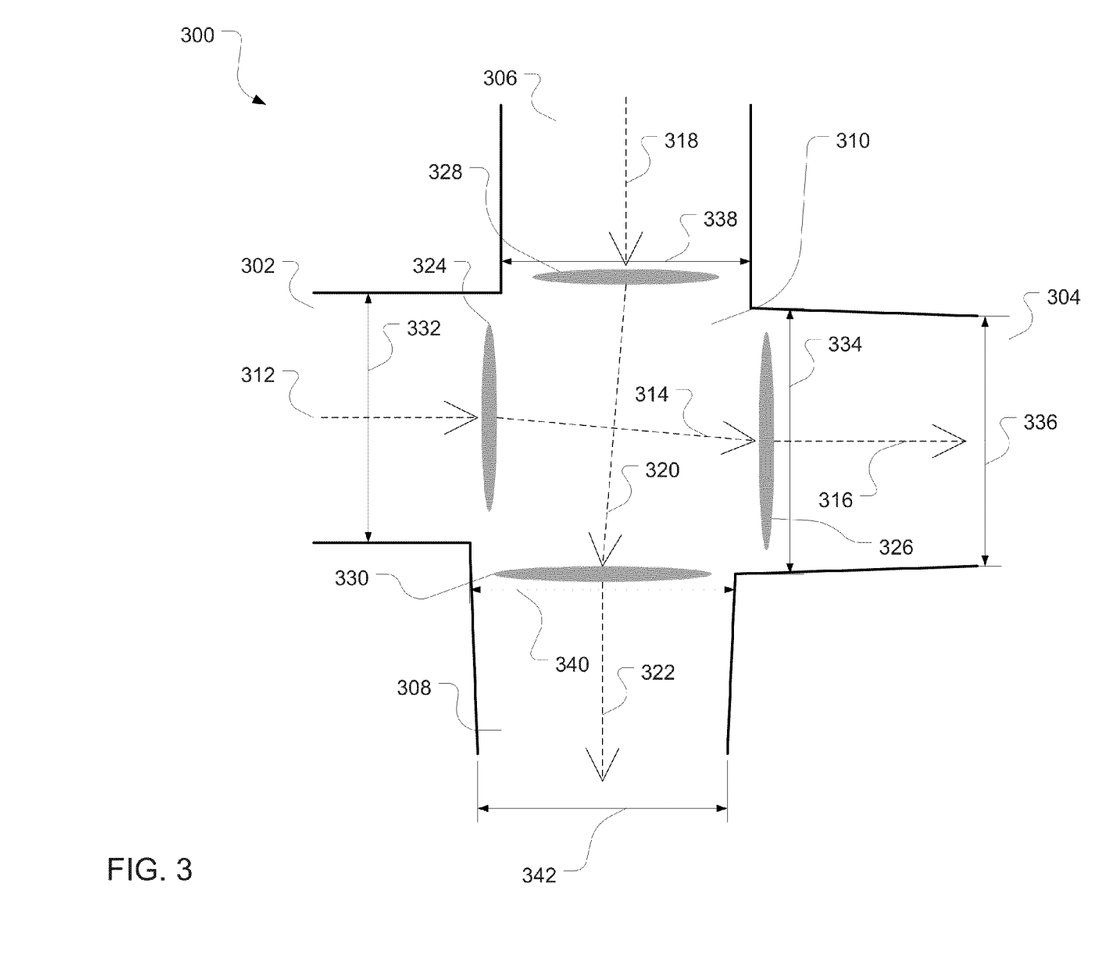
FIG. 3 is an illustration of one embodiment of an optical crossing.

FIG. 3 is an illustration of one embodiment of an optical crossing 300. Optical crossing 300 may be embodied in a PIC made using a variety of material systems, including silica on silicon, LiNbO3, and GaAs, among others. Optical crossing 300 includes an input waveguide 302 and an output waveguide 304. Input waveguide 302 and output waveguide 304 form a primary light path 312 through a crossing region 310. Primary light path 312 intersects a crossing light path 318 at crossing region 310, which bisects input waveguide 302 and output waveguide 304. Crossing light path 318 is formed by an input crossing waveguide 306 and an output crossing waveguide 308, which is also bisected by crossing region 310.

Input waveguide 302 has an input width 332 and refractive index cross section that defines a fundamental optical mode. Input width 332 is defined in the lateral dimension for input waveguide 302. As primary light path 312 reaches crossing region 310 through input waveguide 302, it assumes a mode shape represented by an input mode spot 324. Input mode spot 324 is centered laterally upon input waveguide 302. Crossing region 310 is unbound laterally with respect to primary light path 312. As a light beam propagates through input waveguide 302 and arrives at crossing region 310, it refracts slightly, angling primary light path 312 to a refracted light path 314. Additionally, as the light beam propagates through crossing region 310, it experiences beam expansion due to diffraction. The resulting output mode shape is slightly larger than that represented by input mode spot 324. The output mode shape is represented an output mode spot 326, which is slightly larger than input mode spot 324.

Output waveguide 304 has a crossing end disposed near crossing region 310 and a distal end disposed away from crossing region 310. Output waveguide 304 is displaced laterally with respect to input waveguide 302. The displacement is intended to center output mode spot 326 laterally on output waveguide 304, thereby improving the overlap of refracted and diffracted light path 314 with the fundamental mode for output waveguide 304. The displacement reduces loss otherwise experienced when the fundamental mode for output waveguide 304 is co-linear with input waveguide 302, therefore not accounting for refraction as light path 312 enters crossing region 310. The displacement is quantified by a lateral offset of output mode spot 326 from input mode spot 324. The lateral offset can be computed based on the expected refraction and diffraction through crossing region 310, which is typically a function of the dimensions of crossing region 310.

Output waveguide 304 has an output crossing width 334, in the lateral dimension, at its crossing end. Output crossing width 334 is slightly larger than input width 332. The slight increase in width accounts for beam expansion experienced as a light beam propagates through crossing region 310. Output crossing width 334 can be computed according to the expected beam expansion, which is typically computed as a function of the dimensions of crossing region 310. The computation can be based on a paraxial Gaussian beam calculation, which uses the length of crossing region 310 along the direction of propagation of the light path. Alternatively, the propagation computation can be based on a beam propagation calculation or a finite difference time domain calculation. The larger width of output crossing width 334 further improves the overlap of the diffracted light path and slightly larger output mode shape with the fundamental mode of output waveguide 304, thereby further reducing loss. The optical efficiency at the proximal end of output waveguide 304 can be computed as an overlap integral of the electromagnetic fields of light path 314 and output mode spot 326. The optical efficiency computation can alternatively be based on a beam propagation calculation or a finite difference time domain calculation.

As diffracted light path 314 enters output waveguide 304 at its crossing end, it refracts again, assuming a primary output light path that is parallel to primary light path 312. Output waveguide 304 tapers down to an output distal width 336 that is equal to input width 332. The taper of output waveguide 304 compensates for the beam expansion experienced through crossing region 310. The taper, from output crossing width 334 to output distal width 336 can be made over a short distance, such as the distance between crossing region 310 and another crossing region in series. The taper allows serial crossing regions to have a consistent input width. Otherwise, the waveguide width would get progressively larger, which presents practical issues with use of the crossing.

Similar to primary light path 312, crossing light path 318 refracts as it enters crossing region 310, diffracts and expands as it spans crossing region 310, and refracts as it leaves crossing region 310. Input crossing waveguide 306 has an input crossing width 338 that defines a fundamental mode. The fundamental mode assumes a crossing mode shape at the boundary of crossing region 310. The crossing mode shape is represented by a crossing input mode spot 328 that is centered laterally with respect to input crossing waveguide 306. As a crossing light beam propagates through input crossing waveguide 306 and reaches crossing region 310, it diffracts, shifting crossing light path 318 to a refracted crossing light path 320. Crossing region 310 is unbound laterally with respect to input crossing waveguide 306, just as it is with respect to input waveguide 302.

As in output waveguide 304, output crossing waveguide 308 has a crossing end disposed near crossing region 310 and a distal end disposed away from crossing region 310. Output crossing waveguide 308 has an output crossing width 340 that is slightly larger than input crossing width 338 to accommodate a slightly larger crossing output mode shape represented by a crossing output mode spot 330. Output crossing waveguide 308 also tapers from output crossing width 340 at its crossing end to an output crossing distal width 342 at its distal end, which is equal to input crossing width 338. Additionally, output crossing waveguide 308 is displaced laterally with respect to input crossing waveguide 306 to account for refraction as light path 318 enters crossing region 310 and the propagation of refracted and diffracted crossing light path 320 through crossing region 310. The lateral offset is represented by crossing output mode spot 330 centered laterally upon output crossing waveguide 308.

The refraction, diffraction, and beam expansion of a light beam propagating from input crossing waveguide 306, through crossing region 310, and to output crossing waveguide 308 can be computed as a function of the dimensions of crossing region 310, similar to the refraction, diffraction, and beam expansion experienced along primary light path 312. The lateral displacement and larger output crossing width 340 improve the overlap of refracted diffracted crossing light path 320 and crossing output mode spot 330 with the fundamental mode of output crossing waveguide 308, thereby reducing loss otherwise experienced due to beam expansion and diffraction.

The lateral dimensions of input waveguide 302 and output waveguide 304 relative to input crossing waveguide 306 and output crossing waveguide 308 can vary by application. Input width 332 can be larger, equal, or smaller than input crossing width 338. In certain embodiments, one light path may have more crossings than another, in which case the application calls for more crossings along primary light path 312 than along crossing light path 318. In those cases, dimensions of the respective waveguides are considered, as it impacts the length of crossing region 310 and therefore the amount of diffraction and beam expansion experienced. If possible, the number of crossings along lengthy crossing regions is minimized.

Figure 4:
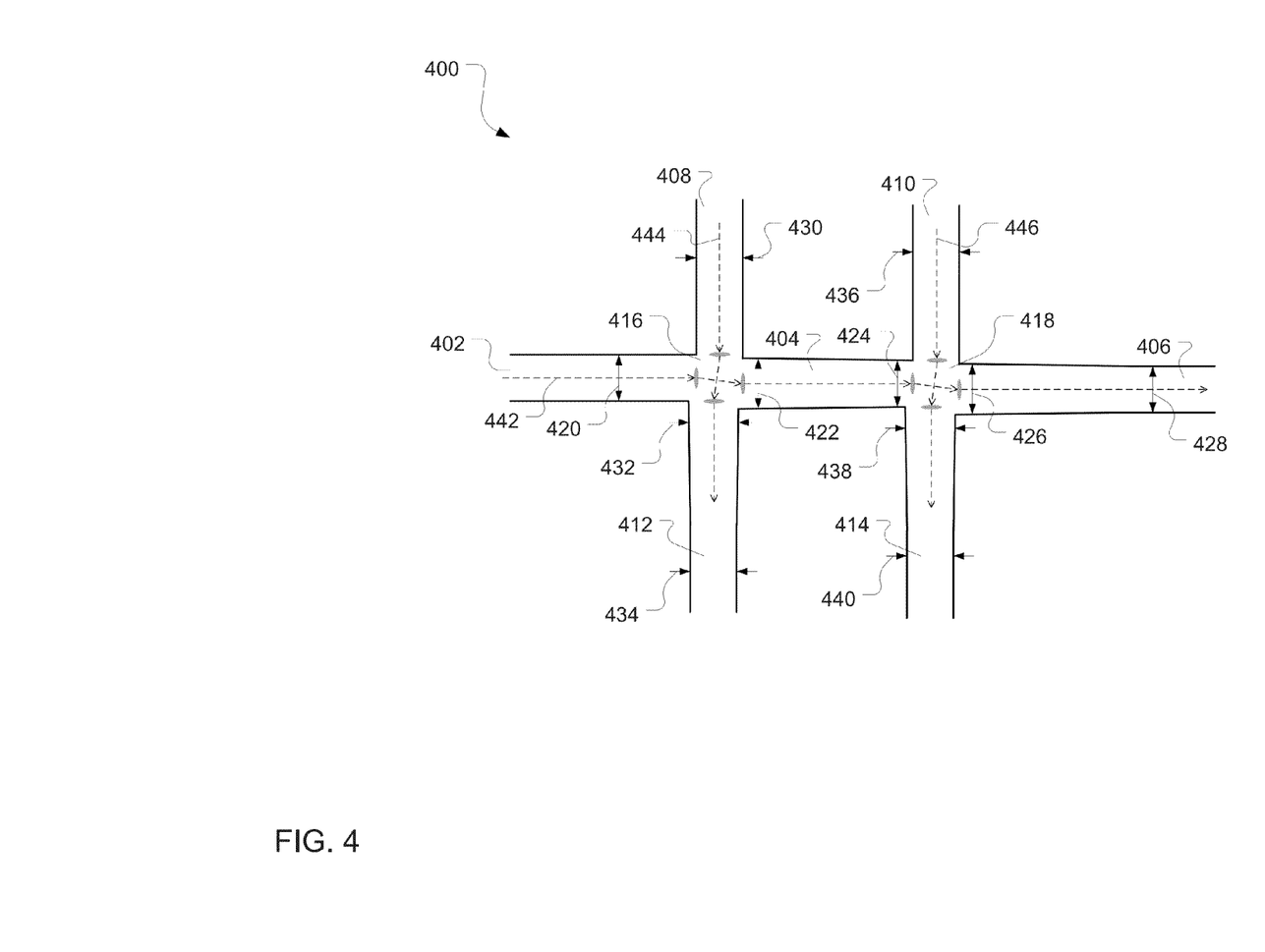
FIG. 4 is an illustration of one embodiment of a series of optical crossings.

FIG. 4 is an illustration of one embodiment of a series of optical crossings 400. Optical crossings 400 may be embodied in a PIC made using a variety of material systems, including silica on silicon, LiNbO3, and GaAs, among others. Optical crossings 400 include a primary light path 442 formed by an input waveguide 402, an intermediate waveguide 404, and an output waveguide 406. Primary light path 442 passes through a first crossing region 416 that bisects input waveguide 402 and intermediate waveguide 404 at an intersection with a first crossing input waveguide 408 and a first crossing output waveguide 412. Primary light path 442 also passes through a second crossing region 418 that bisects intermediate waveguide 404 and output waveguide 406 at an intersection with a second crossing input waveguide 410 and a second crossing output waveguide 414.

First crossing region 416 and second crossing region 418 are similar to crossing region 310 of FIG. 3. At first crossing region 416, intermediate waveguide 404 is displaced laterally with respect to input waveguide 402. Additionally, intermediate waveguide 402 has a first crossing width 422 that is slightly larger than an input width 420 of input waveguide 402. The displacement and enlargement of intermediate waveguide 404 at first crossing region 416 accounts for beam refraction, diffraction, and expansion experienced as primary light path 442 passes through first crossing region 416.

Intermediate waveguide 404 tapers from first crossing width 422 to a second crossing width 424 that is equal to input width 420. In other words, along primary light path 442, the input width of first crossing region 416 is equal to the input width of second crossing region 418. At second crossing region 418, output waveguide 406 is displaced laterally with respect to intermediate waveguide 404. Additionally, output waveguide 406 has a crossing width 426 that is slightly larger than second crossing width 424 of intermediate waveguide 404. The displacement and enlargement of output waveguide 406 at second crossing region 418 accounts for beam refraction, diffraction, and expansion experienced as primary light path 442 passes through second crossing region 418. Again, as in intermediate waveguide 404, output waveguide 406 tapers from crossing width 426 to an output width 428 that is equal to input width 420 and second crossing width 424.

First crossing input waveguide 408 and second crossing input waveguide 410 are similar to input crossing waveguide 306 of FIG. 3. First crossing output waveguide 412 and second crossing output waveguide 414 are similar to output crossing waveguide 308, also of FIG. 3. A first crossing light path 444 begins in first crossing input waveguide 408, passes through first crossing region 416, and then on through first crossing output waveguide 412. As a light beam propagating along first crossing light path 444 propagates through first crossing region 416, it experiences refraction, diffraction, and beam expansion. The expected refraction, diffraction, and beam expansion are accounted for by a first crossing output waveguide crossing width 432 being slightly larger than a first crossing input waveguide width 430. Additionally, first crossing output waveguide 412 is displaced laterally with respect to first crossing input waveguide 408. The displacement and enlargement improve the overlap of first crossing light path with the fundamental mode of first crossing output waveguide 412. First crossing output waveguide 412 also tapers from first crossing output waveguide crossing width 432 down to a first crossing output waveguide distal width 434 that is equal to first crossing input waveguide width 430.

As in first crossing light path 444, second crossing light path 446 begins in second crossing input waveguide 410, passes through second crossing region 418, and then on through second crossing output waveguide 414. As a light beam propagating along second crossing light path 446 propagates through second crossing region 418, it experiences refraction, diffraction, and beam expansion. The expected refraction, diffraction, and expected beam expansion is accounted for by a second crossing output waveguide crossing width 438 being slightly larger than a second crossing input waveguide width 436. Additionally, second crossing output waveguide 414 is displaced laterally with respect to second crossing input waveguide 410. The displacement and enlargement improve the overlap of second crossing light path 446 with the fundamental mode of second crossing output waveguide 414. Second crossing output waveguide 414 also tapers from second crossing output waveguide crossing width 438 down to a second crossing output waveguide distal width 440 that is equal to second crossing input waveguide width 436.

In some embodiments, the system performance requirements on input waveguide 402 are more stringent than those on first crossing input waveguide 408. For example, primary light path 442, which includes input waveguide 402, can have a lower optical loss budget than first crossing light path 444, which includes first crossing input waveguide 408. This can occur, for example, when input waveguide 402 has many crossings and first crossing input waveguide 408 has only a few. In that case, the crossing loss required for input waveguide 408 is different than the crossing loss for first crossing input waveguide 408. In embodiments where this occurs, the light path requiring lower optical loss can use wider waveguides. In the embodiment of FIG. 4, input waveguide 402 would be wider than first crossing input waveguide 408 and second crossing input waveguide 410, which is to say that input width 420 is larger than first crossing input waveguide width 430 and second crossing input waveguide width 436. Consequently, first crossing region 416 and second crossing region 418 would be more rectangular-shaped, as opposed to more square-shaped when input width 420, first crossing input waveguide width 430, and second crossing input waveguide width 436 are equal.

Generally, larger beams entering a crossing region experience lower loss, because the diffraction in the crossing region is lower and larger beams diffract less than small beams. Wider waveguides have larger modes, and are therefore better suited for light paths requiring lower optical loss. This is advantageous where one light path has many crossings, for example, 100 or more, and other light paths have relatively few crossings, for example, on the order of ten. In the embodiment of FIG. 4, primary light path 442 has two crossings, while first crossing light path 444 and second crossing light path 446 have only one, although FIG. 4 illustrates a small section of a likely much larger PIC that can include hundreds of crossings.

Another consideration in determining the width of waveguides is any additional optical loss incurred by tapering from a narrow single-mode waveguide, which are often found in active devices such as modulators, switches, etc., to a wide multi-mode waveguide. This tapering loss increases with the width of the wide multi-mode waveguide. The taper loss, propagation losses through wide multi-mode waveguides, and losses in crossings can be balanced according to the number of crossings in a given light path. For example, in the embodiment of FIG. 4, input width 420, first crossing input waveguide width 430, and second crossing input waveguide width 436, and, consequently, the shapes of first crossing region 416 and second crossing regions 418, can be determined according to the number of crossings along primary light path 442, first crossing light path 444, and second crossing light path 446, as well as losses incurred while propagating through input waveguide 402, intermediate waveguide 404, output waveguide 406, first crossing input waveguide 408, first crossing output waveguide 412, second crossing input waveguide 410, and second crossing output waveguide 414. Additionally, although no tapers from single-mode waveguide to wide multi-mode waveguide are illustrated in FIG. 4, any taper losses should also be considered.

Figure 5:
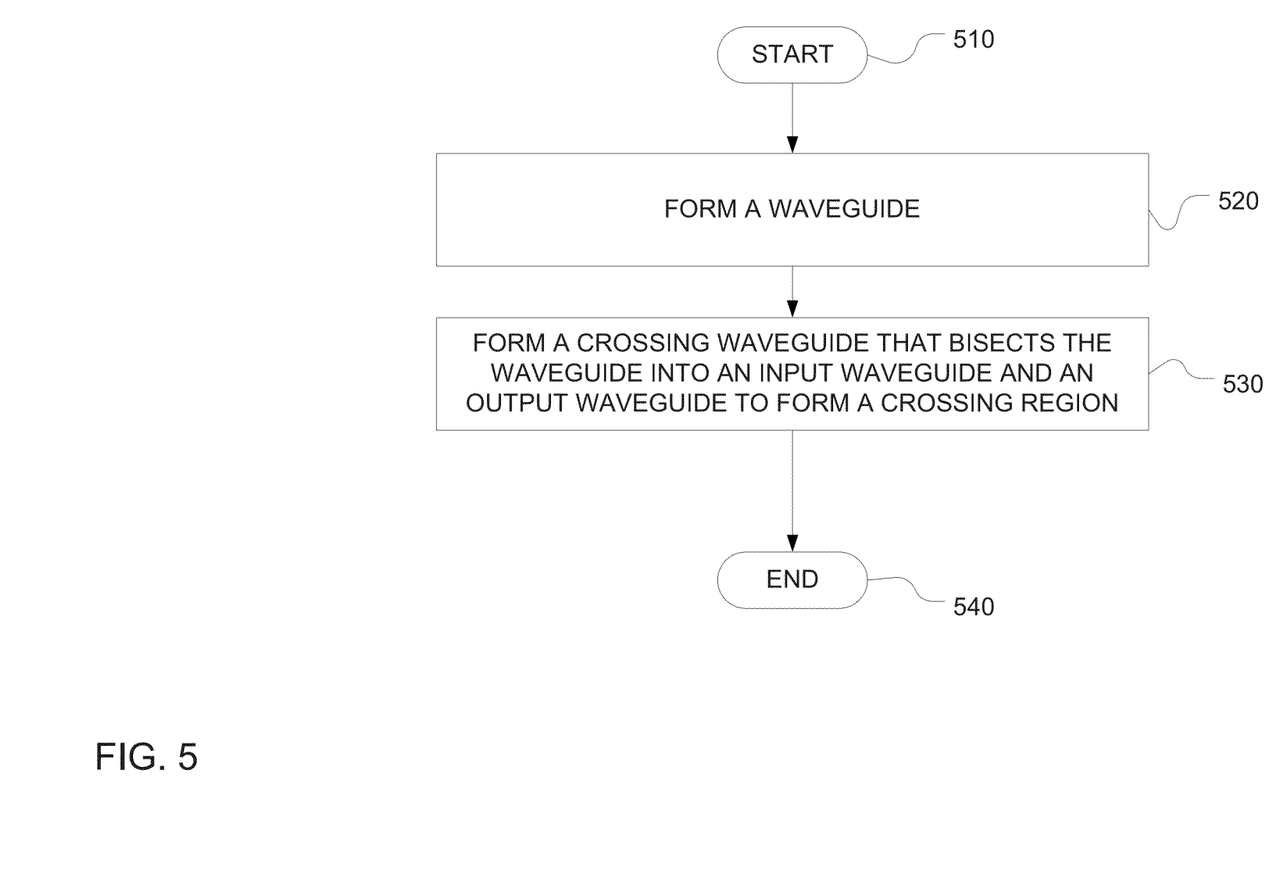
FIG. 5 is a flow diagram of one embodiment of a method of forming a PIC.

FIG. 5 is a flow diagram of one embodiment of a method of making an optical crossing in a PIC. The method begins at a start step 510. At a step 520, a first waveguide is formed. At a step 530, a crossing waveguide is formed that bisects the first waveguide into an input waveguide and an output waveguide. The intersection of the first waveguide and the crossing waveguide forms a crossing region. The output waveguide is slightly larger than the input waveguide. The increase is in a lateral dimension, or width, perpendicular to a light path through the first waveguide. The increased width of the output waveguide accounts for light beam expansion that is experienced as a light beam propagating through the first waveguide propagates through the crossing region formed in step 530. The increase in width, or the difference in width between the input waveguide and the output waveguide, is computable according to an expected light beam expansion as a function of the dimensions of the crossing region and, more specifically, a function of the length of the crossing region in the dimension of the light path through the first waveguide.

The output waveguide is also displaced laterally by an offset value that is computable according to the dimensions of the crossing region. The displacement is with respect to the input waveguide and is such that the input waveguide and output waveguide are not co-linear. The displacement accounts for light beam refraction as a light beam enters and propagates through the crossing region along the light path through the first waveguide.

In certain embodiments, the output waveguide tapers from the increased width at the crossing region down to a width equal to that of the input waveguide. This allows the crossing formed in step 530 to be repeated in series without progressively growing the first waveguide as it crosses each crossing waveguide. The method then ends at a step 540.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A photonic integrated circuit (PIC) having an optical crossing, comprising:
   a crossing region having a crossing length, wherein a light path through the crossing region is laterally unbound;
   an input waveguide having an input crossing end and an input distal end, and coupled to the crossing region at the input crossing end, thereby partially forming the light path; and
   an output waveguide having an output crossing end and an output distal end, and coupled to the crossing region at the output crossing end, thereby partially forming the light path,
   wherein the crossing region is laterally planar with the input crossing end of the input waveguide, and laterally planar with the output crossing end of the output waveguide,
   wherein a crossing width of the output waveguide at the output crossing end is larger than a crossing width of the input waveguide at the input crossing end according to the crossing length, and
   wherein a lateral center of the output waveguide at the output crossing end is laterally displaced by an offset from a lateral center of the input waveguide at the input crossing end according to the crossing length.

2. The PIC of claim 1, wherein the output waveguide is tapered from the crossing width at the output crossing end to the crossing width of the input waveguide at the output distal end.

3. The PIC of claim 1, further comprising a crossing waveguide arranged perpendicular to and co-planar with respect to the input waveguide and the output waveguide, and having a first width equal to the crossing length.

4. The PIC of claim 1, wherein a difference between the crossing width of the output waveguide and the crossing width of the input waveguide accounts for light beam expansion through the crossing region.

5. The PIC of claim 1, wherein the offset accounts for a lateral refraction and diffraction of an incident light beam through the crossing region.

6. The PIC of claim 1, wherein the input waveguide and the output waveguide support multiple lateral modes.

7. The PIC of claim 6, wherein only a lowest order mode of the multiple lateral modes is excited within the input waveguide and the output waveguide.

8. The PIC of claim 7, wherein the lowest order mode is a transverse electrical wave.

9. The PIC of claim 7, wherein the lowest order mode is a transverse magnetic wave.

10. The PIC of claim 1, wherein the light path through the crossing region is vertically unbound, thereby causing vertical diffraction of an incident light beam.

11. The PIC of claim 10, wherein a crossing height of the output waveguide at the output crossing end is larger than a crossing height of the input waveguide at the input crossing end according to the crossing length, and wherein a vertical center of the output waveguide at the output crossing end is vertically displaced by another offset from a vertical center of the input waveguide at the input crossing end according to the crossing length.

12. The PIC of claim 1, further comprising a plurality of optical crossings.

13. A method of making a photonic integrated circuit (PIC) having an optical crossing, comprising:
   forming a waveguide; and
   forming a crossing waveguide that bisects the waveguide into an input waveguide and an output waveguide, thereby forming a crossing region laterally planar with the input and output waveguides adjacent the crossing region,
   wherein the output waveguide at the crossing region is wider than the input waveguide at the crossing region, and
   wherein the output waveguide at the crossing region is displaced laterally from the input waveguide at the crossing region by an offset.

14. The method of claim 13, further comprising determining the offset according to refraction and diffraction of a light beam traveling through the crossing region.

15. The method of claim 13, wherein the output waveguide tapers from the crossing region to a width of the input waveguide.

16. The method of claim 15, further comprising forming another crossing waveguide that bisects the output waveguide, thereby forming another crossing region between a first output waveguide and a second output waveguide,
   wherein the first output waveguide includes a tapered portion of the output waveguide and has the width of the input waveguide at the another crossing region,
   wherein the second output waveguide is wider than the first output waveguide at the another crossing region, and
   wherein the second output waveguide is displaced laterally by another offset according to another refraction and diffraction of the light beam traveling through the another crossing region.

17. The method of claim 16, wherein the second output waveguide tapers from the another crossing region to the width of the input waveguide.

18. The method of claim 13, wherein the waveguide supports multiple lateral modes.

19. The method of claim 18, wherein the waveguide is configured to excite only a lowest order mode.

20. The method of claim 13, wherein the waveguide and the crossing waveguide intersect at a 90 degree angle.

21. The method of claim 13, wherein the forming of the waveguide includes forming a waveguide core of silicon and forming a cladding of silica.

22. The method of claim 21, wherein the forming further includes forming a laterally surrounding region of silicon around the waveguide core that is thinner than the waveguide core, thereby forming a ridge waveguide with shoulders.

23. The method of claim 13, further comprising setting a difference in width of the output waveguide at the crossing region and the input waveguide according to a light beam expansion through the crossing region.

* * * * *